Patented July 10, 1951

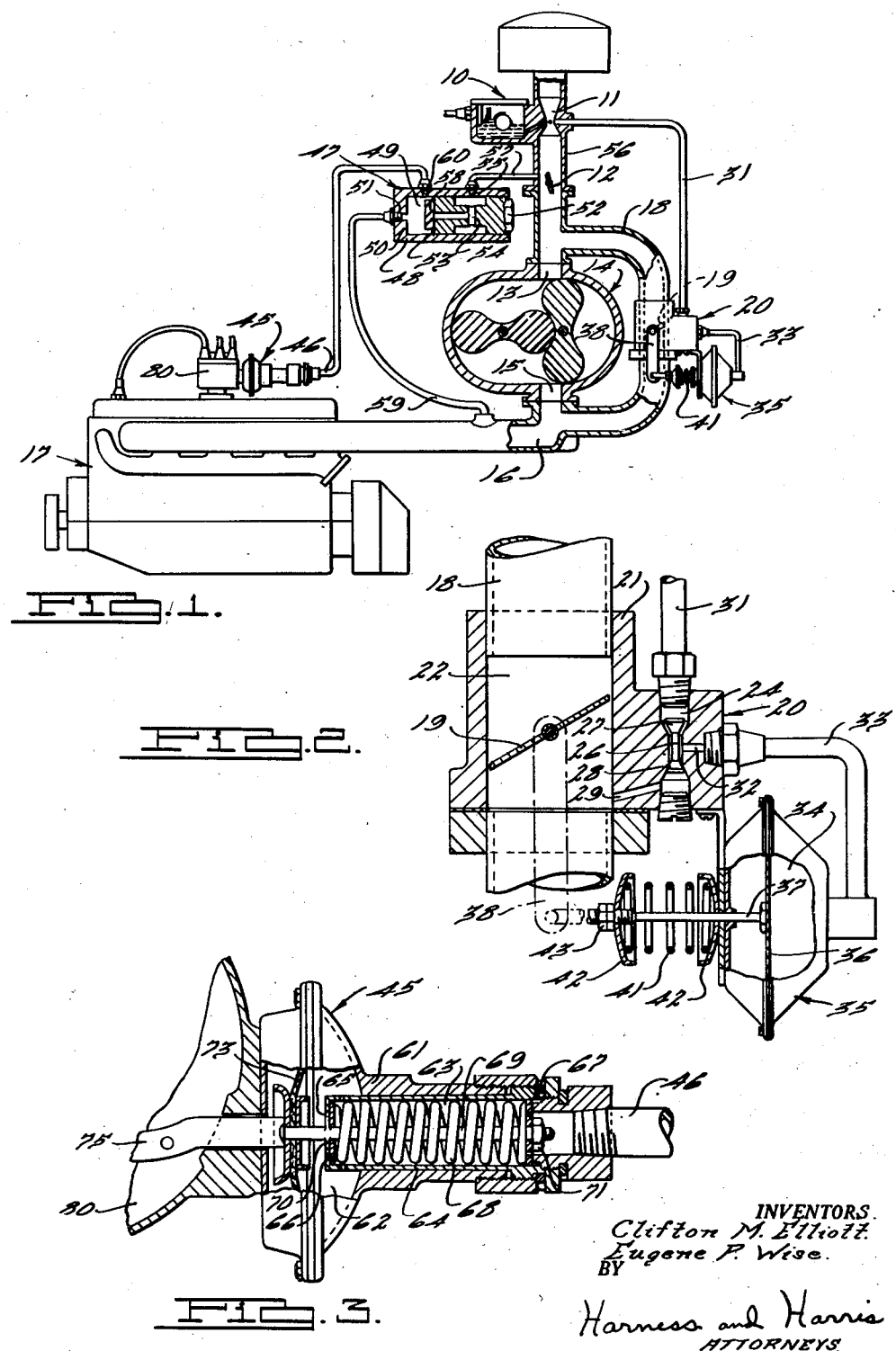

2,559,859

UNITED STATES PATENT OFFICE 2,559,859

SUPERCHARGED ENGINE CONTROL

Clifton M. Elliott and Eugene P. Wise, Birmingham, Mich., assignors to Chrysler Corporation, Highland Park, Mich., a corporation of Delaware Application December 11, 1948, Serial No. 64,747

26 Claims. (Cl. 123—119)

This invention relates to a supercharged engine installation and particularly to automatically operated control means for such an installation which will improve the efficiency and operating characteristics of the installation.

The control system for this supercharged engine installation includes two features that contribute materially to the improved performance achieved with the installation, namely, an automatically operated supercharger by-pass system that is conjointly controlled by the vacuum or negative pressures in the carburetor venturi and the engine intake manifold, and an automatically operated distributor spark control that is conjointly controlled by the pressures in the carburetor throat and the engine intake manifold.

This invention is primarily designed for an engine installation including an internal combustion engine provided with a positive displacement type of blower that is driven by the engine at a fixed speed ratio, the blower being arranged to supply the fuel charge to the engine at superatmospheric pressure. In such an installation the engine works over a wide range of speed and load conditions and the actual fuel charge requirements of the engine depend on the load on the engine. Accordingly, if the capacity of the blower is such as to provide a sufficient fuel charge for maximum engine torque at any speed, then it is necessary to provide some means to reduce the output capacity of the blower when less than maximum engine torque is required. Various types of manually operated, linkaged controlled, blower unloading valves and the like have been proposed to accomplish the above result but all of these have certain obvious disadvantages. In contrast we have provided an automatically operated blower by-pass system that is free of the disadvantages of the manually operated systems and one that improves the efficiency and operating characteristics of the engine installation due to the fact that it automatically provides supercharging only at the times the load on the engine requires it and at all other times the excess output of the blower is by-passed around the blower. This by-passing arrangement unloads the blower and thereby reduces the engine output absorbed by the blower, and thus prevents waste of the fuel charge.

In addition to the blower by-passing system this engine installation includes an automatically operated distributor spark control that advances and retards the spark in accordance with the variations in the quantity of fuel charge delivered to the engine due to the intermittent operation of the supercharger. The spark control device disclosed permits operation of the supercharged engine at optimum ignition advance throughout the normal operating range.

It is a primary object of this invention to provide a by-pass control system for the blower of a supercharged engine installation, which system is adapted to be automatically controlled by a device that automatically selects the higher vacuum from among those concurrently existing in certain components of the installation and uses this selected vacuum in a manner such that the supercharging effect is automatically applied at all times when it is needed and desired and automatically discontinued at all other times.

It is a further object of this invention to provide a distributor spark control for a supercharged engine installation that is automatically controlled by a device that automatically selects the higher pressure from among those concurrently existing in certain components of the installation and uses this selected pressure in such a manner that it insures operation of the engine at optimum ignition advance.

Other objects and advantages of this invention will become apparent from a reading of the attached description and a consideration of the related drawings wherein:

Fig. 1 is a side elevation of an engine installation embodying this invention, portions of the installation being broken away and shown in section for the sake of clarity;

Fig. 2 is an enlarged, fragmentary, sectional elevation of the by-pass control valve unit proposed for this installation; and Fig. 3 is an enlarged, fragmentary, sectional elevation of the distributor spark control device proposed for use with this installation.

In the supercharged engine installation herein disclosed the fuel charge is drawn through the carburetor 10 past open throttle valve 12 and delivered to the inlet 13 of the engine driven, positive displacement, blower 14. The fuel charge from carburetor 10 normally enters the blower inlet 13 and is discharged from the blower outlet 15 into the engine intake manifold 16 which conducts the fuel mixture to the cylinders of the engine 17.

The supercharger 14 includes a by-pass system that governs the output of the supercharger as well as the load on the supercharger and consequently the engine load absorbed by the supercharger. The supercharger by-pass system includes the by-pass conduit 18 around the supercharger and the by-pass control valve 19 rotatably mounted in the conduit 18 and adapted to be automatically operated by the by-pass valve control unit 20.

By-pass valve control unit 20 is preferably formed as a fitting which is adapted to be mounted in the by-pass conduit 18. Valve unit 20 includes the casing 21 through which there extends the conduit channel 22. Channel 22 is shaped so that it will form a continuous part of the conduit 18 when unit 20 is mounted between the sections of conduit 18. By-pass valve 19 is mounted in casing channel 22 so that it may control passage of the fuel charge through the by-pass conduit 18. Casing 21 also includes the dumbbell-shaped valve cylinder bore 24 which slidably receives the two-way double-ended, selector valve 26. Selector valve 26 has spaced apart cone-shaped heads 27 and 28 which are adapted to be alternately seated on the cone-shaped valve seats at the opposite ends of valve cylinder 24. Valve bore 24 is connected to the intake manifold side of by-pass conduit 18 by the casing bore 29 which intersects the casing channel 22 on the intake manifold side of control valve 19. The other end of valve bore 24 is connected to the venturi 11 of carburetor 10 by the conduit 31. The centrally disposed neck portion of valve bore 24 is connected by casing bore 32 to one end of a conduit 33, the other end of conduit 33 being connected to the sealed chamber 34 of diaphragm control unit 35. Diaphragm control unit 35 includes the flexible diaphragm 36, which is formed of some resilient material such as rubber or the like. A plunger rod 37 is mounted on diaphragm 36 so that it will reciprocate as the pressure applied to chamber 34 of diaphragm control unit 35 is varied. Plunger rod 37 is connected to the lever arm 38 of by-pass control valve 19 so that movement of diaphragm 36 will effect rotation of the control valve 19. A compression spring 41 is threaded about a portion of the plunger rod 37 that extends between the diaphragm control unit 35 and the valve lever 38. Spring 41 is held between a pair of washer caps 42, one of which is anchored to the casing of control unit 35 and the other anchored to a portion of rod 37 by means of the adjusting nuts 43 threaded on the outer end portion of rod 37. By means of the adjusting nuts 43 the spring force normally urging the by-pass control valve 19 to closed position may be varied to meet the specific requirements of the installation. With the by-pass control unit herein disclosed the two-way selector valve 26 is adapted to select the highest of the vacuums in the intake manifold 16 and the carburetor venturi 11 and apply this selected vacuum to the sealed chamber side of the diaphragm 36. The other side of diaphragm 36 is acted on by atmospheric pressure and the force exerted by spring 41. It will be noted that these latter two forces act in opposite directions, therefore their resultant is the difference rather than the sum of their individual effects.

Operation of the supercharger by-pass system is as follows:

At closed throttle, the throttle valve 12 is closed and the vacuum effect in the intake manifold 16 is higher than that in the carburetor venturi 11, therefore, valve head 28 is open and valve head 27 is closed. Accordingly, the vacuum effect in intake manifold 16 is transmitted through open valve 28, casing bore 32 and conduit 33 to control unit 35 and is applied to the sealed chamber 34 of diaphragm control 35. At closed throttle the intake manifold vacuum is sufficiently high so that it will cause the plunger rod 37 to be moved towards the right compressing spring 41. Movement of piston rod 37 towards the right rotates valve lever 38 in a counterclockwise direction and opens by-pass valve 19. Opening by-pass valve 19 connects the by-pass conduit 18 around the blower 14 and this recirculates the fuel mixture through the blower 14. The recirculation of the fuel mixture through the blower reduces the output of the blower and also reduces the pressure differential across the blower which reduces the blower load. Consequently, at closed throttle the engine supercharging effect is substantially eliminated.

Subsequently, upon opening of the throttle valve 12 to accelerate, the engine will be speeded up and, as will be explained, the by-pass control system will automatically close the by-pass valve 19 and cause the supercharger to force a large quantity of the high pressure fuel mixture into the intake manifold. Upon opening of the throttle valve 12 to accelerate, the vacuum or negative pressures in both the intake manifold 16 and the carburetor venturi 11 are reduced to such an extent that there is insufficient vacuum in either of the conduits 18 or 31 to hold the spring 41 in its compressed, open valve, position. Therefore, spring 41 expands and moves plunger rod 37 towards the left and closes the by-pass control valve 19. Closing by-pass control valve 19 stops recirculation of the high pressure fuel mixture through the blower 14 and directs all the fuel charge in blower 14 into the intake manifold 16 which automatically increases the supercharging effect. With the arrangement herein described it is obvious that supercharging will be automatically brought into action during acceleration of the vehicle, the very time when additional power is most needed.

When open throttle acceleration is no longer necessary and the throttle valve has been partially closed to provide merely enough fuel for normal road load power then the vacuum in the intake manifold 16 is sufficient to seat valve head 27. Application of the intake manifold vacuum to the diaphragm 36 of control unit 35 under such conditions is sufficient to open by-pass valve 19 and thereby substantially eliminate the supercharging effect at normal road load.

As the vehicle is accelerated with the carburetor throttle 12 wide open, eventually an engine speed is reached where there is sufficient vacuum in the carburetor venturi 11 to seat valve head 28 and apply the Venturi vacuum to the diaphragm 36 of control unit 35. The Venturi vacuum under such conditions is sufficient to move the diaphragm 36 towards the right and open by-pass valve 19 so as to materially reduce the supercharging effect of blower 14. Opening of by-pass valve 19 at high vehicle and engine speeds acts as a speed governing device to prevent the engine and vehicle speeds from reaching dangerous values. This also results in improved economy and durability of the supercharged engine.

From the above it is thought to be obvious that the supercharged by-pass system herein disclosed provides means for automatically maintaining the by-pass valve 19 open at closed throttle engine idle, closed during the acceleration periods when the throttle valve is opened to a considerable degree, open at normal road loads when the throttle valve is partially closed, and open when the vehicle and engine speeds are relatively high and the throttle valve is opened a considerable amount. The supercharging effect is accordingly brought into existence when needed and under all other conditions the supercharging effect is automatically discontinued or reduced and the blower unloaded so that it soaks up only a minimum of the engine output available to drive the blower. It will be noted that the by-pass control arrangement herein disclosed is completely automatic and does not require linkage controls between the throttle and by-pass valves nor the use of engine-driven governors or the like, all of which would tend to complicate the system and materially increase the cost of such an installation.

As a result of the variation in absolute intake manifold pressure resulting from supercharging, it is necessary to provide a means to automatically retard the spark at closed throttle engine idle when by-pass valve 19 is open, advance the spark when the throttle valve 12 is partially closed and the by-pass valve 19 open for normal road loads, and to retard the spark when the throttle valve 12 is open and the by-pass valve 19 closed for accelerating purposes. One form of diaphragm operated distributor spark control device adapted to automatically accomplish these multiple functions is shown in Fig. 3 of the drawings. This spark control device is normally operated by the pressure in the intake manifold 16 except at closed throttle engine idle when the pressure in the carburetor throat 56 on the upstream side of the throttle valve 12 controls the degree of spark advance. This spark control device, represented by the numeral 45, is adapted to be mounted on the conventional distributor 80. Spark control device 45 is connected by conduit 46 to a selector valve unit 47 which is similar in operation to the selector valve unit 20 used with the blower by-pass system.

Selector valve 47 comprises a casing 48 having a valve cylinder bore 49 extending lengthwise thereof and terminating at one end in a valve seat 50. A casing bore 51 piercing the end of casing 48 adjacent the valve seat 50 receives one end of the conduit 59, the other end of conduit 59 being connected to the engine intake manifold 16. The opposite end of the selector valve casing 48 is fitted with a plug member 52 which provides another valve seat 53 spaced from but parallel with the valve seat 50. Plug 52 is pierced by intersecting bores 54 adapted to connect the casing bore 55 to the end of valve bore 49 adjacent valve seat 53. Casing bore 55 is connected by the conduit 57 to the throat 56 of carburetor 10 immediately upstream from the throttle valve 12. A plate type selector valve 58, slidably mounted in the valve bore 49, is adapted to be seated on either of the valve seats 50 or 53. The conduit 46 extending between the spark control device 45 and selector valve 47 is connected to the intermediate portion of valve cylinder bore 49 through the casing bore 60. Selector valve 47 is adapted to select the higher pressure in the intake manifold and carburetor throat and apply that selected pressure to the control device 45 so as to automatically effect advance and retardation of the spark in distributor 80 in accordance with the engine torque requirements.

Spark control device 45, see Fig. 3, comprises a diaphragm supporting casing 61 having the sealed chamber 62 thereof connected to the pressure conduit 46 through a hollow throat portion 63. Fixedly mounted in the hollow throat portion 63 of casing 61 is a cup-shaped sleeve 64 having an opening 65 in the closed end thereof. Seated within the cup-shaped sleeve 64 are a pair of spaced apart plate washers 66 and 67 between which there is mounted a compression spring 68. Extending through the center of assembled sleeve 64, washers 66 and 67 and spring 68 is a rod 69. One end of the rod 69 is connected to plate washer 67 by the nut 71 which is threaded on one end of rod 69. The other end of rod 69 is connected to the resilient diaphragm 73 supported in the casing 61. Rod 69 carries a plurality of radially extending projections 70 which seat against the outer side of plate washer 66. Spring 68 is mounted within the sleeve 64 in such a manner that no load is applied to the spring 68 when neither superatmospheric pressure nor vacuum is applied to the diaphragm 73 through conduit 46. Washers 66 and 67 and sleeve 64 are pierced by suitable apertures to permit the application of the pressure in the conduit 46 to the diaphragm 73. Connected to the side of the diaphragm 73 opposite the sealed chamber 62 is a control arm 75 which is suitably connected to the breaker plate (not shown) of distributor 80 so that reciprocation of the control arm 75 will effect rotation of the breaker plate and cause advance and retardation of the distributor spark.

Operation of the spark control device 45 is as follows:

Pressure from the selector valve 47 is transmitted to diaphragm 73 through conduit 46 and the hollow throat of casing 61. This pressure will exert a force on diaphragm 73 which is transmitted by rod 69 through washer 67 to spring 68. Compression of spring 68 will permit diaphragm 73 to move towards the left and allow control arm 75 to rotate the distributor breaker plate clockwise and retard the spark. Vacuum applied to the diaphragm 73 through conduit 46 will cause an oppositely directed force to be applied to rod 69 causing the radially extending projections 70 to be thrust against plate washer 66 and thereby apply a compressive force to the other end of spring 68. This results in rotation of the distributor breaker plate in the opposite direction to advance the spark. The spark control device shown permits operation of a supercharged engine at or near optimum ignition advance through the normal range of manifold pressures and vacuum. By use of a diaphragm control unit whose action under pressure and vacuum is opposed by spring action, the distributor breaker plate (not shown), which is linked to the diaphragm 73 by control arm 75 is rotated relative to the distributor housing and the spark adjusted accordingly. The rotation of the distributor breaker plate by the diaphragm operated control device 45 causes a change in ignition advance which is proportional to the pressure or vacuum applied to the diaphragm. By using a spark control device similar to that shown in Fig. 3, the spark is retarded at open throttle acceleration for a relatively high pressure exists in the intake manifold 16 at this time due to the supercharging effect of the blower 14. As the throttle valve 12 closes the supercharging effect and pressure in the intake manifold 16 are reduced, and the spark is automatically advanced. At closed throttle engine idle the spark would ordinarily be advanced a considerable degree due to the vacuum in the intake manifold 16 which would give a rough engine idle if it were not for the fact that the selector valve 47 automatically selects the higher of the pressures in the carburetor throat 56 and the intake manifold 16 and applies this selected pressure to the diaphragm 73 of the spark control device 45. At closed throttle engine idle the atmospheric pressure on the upstream side of closed throttle valve 12, where conduit 57 is connected to the carburetor throat 56, is greater than the negative pressure or vacuum in the intake manifold 16, therefore the atmospheric pressure in the carburetor throat 56 is transmitted through conduit 46 to the spark control device 45 thus preventing advance of the spark and insuring a smooth engine idle. From the above description of the spark control device it is thought to be obvious that the distributor 80 has the spark automatically controlled by the pressure in the intake manifold at all times except at closed throttle engine idle when the selector valve 47 applies the atmospheric pressure in the carburetor throat to the diaphragm 73 of control device 45 in order to assure a smooth engine idle at closed throttle. At all other times the spark is advanced and retarded in direct proportion to the pressure in the intake manifold.

By the combined use of the blower by-pass control and the distributor spark control herein disclosed, both of which controls are conjointly controlled by the pressures in the intake manifold and in the carburetor, an improved, highly efficient, completely automatic, relatively simple, supercharged internal combustion engine installation has been provided.

We claim:

1. In combination, an internal combustion engine provided with a fuel supply conduit including a carburetor having a throat with a venturi and an intake manifold downstream from the venturi, a blower connected in the fuel supply conduit between the carburetor and the intake manifold adapted to supply a superatmospheric pressure fuel charge to the intake manifold, a throttle valve mounted in the fuel supply conduit between the carburetor venturi and the inlet to the blower, a by-pass conduit around the blower connecting the outlet of the blower to the inlet of the blower, a by-pass valve mounted in the by-pass conduit, and means to automatically control operation of the by-pass valve adapted to select the higher of the vacuums concurrently existing in the carburetor venturi and the intake manifold and to utilize this selected vacuum for operation of the by-pass valve.

2. In combination, an internal combustion engine provided with a fuel intake conduit having a Venturi passage and an intake manifold, a blower connected in the fuel conduit between the Venturi passage and the intake manifold, a throttle valve mounted in the fuel conduit between the Venturi passage and the inlet to the blower, a by-pass conduit connecting the outlet of the blower to the inlet of the blower, a by-pass valve mounted in the by-pass conduit, pressure responsive means to actuate the by-pass valve, a selector valve connected by conduit means to the Venturi passage, the intake manifold and the pressure responsive means adapted to select the higher of the vacuums concurrently existing in the Venturi passage and the intake manifold and to apply this selected vacuum to the pressure responsive means to effect actuation thereof.

3. In combination, an internal combustion engine provided with a fuel supply conduit including a carburetor having a throat with a venturi and an intake manifold downstream from the venturi, a blower connected in the supply conduit between the carburetor venturi and the intake manifold adapted to increase the rate of flow of the fuel charge to the intake manifold, a throttle valve mounted in the supply conduit between the carburetor venturi and the inlet to the blower, a by-pass conduit around the blower connecting the outlet of the blower to the inlet of the blower, a by-pass valve mounted in the by-pass conduit, and means to automatically control operation of the by-pass valve adapted to select the higher of the vacuums concurrently existing in the carburetor venturi and the intake manifold and to utilize this selected vacuum for operation of the by-pass valve, said means comprising a selector valve assembly connected by conduits to the carburetor venturi and the intake manifold, and a pressure responsive device connected to and operated by the selector valve assembly and arranged to effect operation of the by-pass valve due to variation in the vacuums transmitted by the selector valve assembly to the pressure responsive by-pass valve operating means.

4. In combination, an internal combustion engine provided with a fuel supply conduit including a Venturi passage and an intake manifold, a blower connected in the fuel supply conduit between the Venturi passage and the intake manifold, a throttle valve mounted in the fuel supply conduit between the Venturi passage and the inlet to the blower, a by-pass conduit around the blower connecting the outlet of the blower to the inlet of the blower, a by-pass valve mounted in the by-pass conduit, pressure responsive means to actuate the by-pass valve and pressure operated means controlled by the pressure differential existing between the Venturi passage and the intake manifold to effect operation of the pressure responsive means.

5. The combination set forth in claim 4 wherein the pressure operated means comprises a selector valve assembly connected by conduits to the Venturi passage, the intake manifold and the pressure responsive means and arranged to effect operation of the pressure responsive means due to variation in the pressures in the Venturi passage and the intake manifold.

6. In combination, an internal combustion engine having a fuel supply conduit including an intake manifold and a carburetor with a venturi, an engine driven blower with an inlet and an outlet interposed in the supply conduit between said carburetor and intake manifold, a throttle valve mounted in the supply conduit between the carburetor venturi and the inlet to the blower, a by-pass passage from the outlet side of the blower to a point on the inlet side of the blower between the throttle valve and the blower inlet, a by-pass valve mounted in the by-pass passage, and means for actuating said by-pass valve responsive to the pressure differential existing between the carburetor venturi and the intake manifold.

7. In combination, an internal combustion engine having a fuel supply conduit including an intake manifold and a carburetor with a venturi, a blower with an inlet and an outlet interposed between said carburetor and intake manifold for increasing the rate of delivery of the fuel charge to the engine, a throttle valve mounted in the fuel supply conduit between the carburetor venturi and the inlet to the blower, a by-pass passage from the outlet side of the blower to a point on the inlet side of the blower between the throttle valve and blower inlet, a by-pass valve mounted in the by-pass passage, and means responsive to the pressure existing in the carburetor venturi and the intake manifold to automatically open and close the by-pass valve, said means comprising a valve assembly adapted to select one of the pressures concurrently existing in the carburetor venturi and in the intake manifold and to apply this selected pressure to a pressure responsive device arranged to actuate the by-pass valve due to variation of the applied pressure.

8. In combination, an internal combustion engine having a fuel intake system including a venturi and an intake manifold, a blower with an inlet and an outlet interposed between the venturi and the intake manifold for increasing the pressure and rate of flow of the fuel charge delivered to the engine intake manifold, a throttle valve mounted between the venturi and the inlet to the blower, a by-pass conduit from the outlet side of the blower to a point on the inlet side of the blower between the throttle valve and blower inlet, a by-pass valve mounted in the by-pass conduit, resilient means normally urging the by-pass valve to closed position, a casing having a diaphragm therein, means connecting one side of the diaphragm to the by-pass valve, and a sealed chamber on the other side of the diaphragm connected by conduit means to a selector valve assembly, and conduit means connecting the selector valve assembly to the venturi and the intake manifold, said selector valve assembly being adapted to select the lower of the pressures concurrently existing in the venturi and intake manifold and to transmit this selected pressure to the sealed chamber side of the diaphragm to effect operation of the by-pass valve.

9. In combination, an internal combustion engine having a fuel supply conduit including a Venturi passage and an intake manifold, a supercharger mounted in the fuel supply conduit between the venturi and the intake manifold, a throttle valve mounted in the fuel supply conduit between the venturi and the inlet to the supercharger, a by-pass passage from the outlet side of the supercharger to a point on the inlet side of the supercharger between the throttle valve and supercharger inlet, a by-pass valve mounted in the by-pass passage, resilient means normally urging the by-pass valve to closed position, pressure responsive means adapted to open the by-pass valve, and pressure operated means connected to the venturi, the intake manifold and the pressure responsive means to actuate the latter.

10. In combination, an internal combustion engine, a fuel conduit to said engine including a venturi and a throttle valve, an engine driven blower connected in said conduit between the throttle valve and engine, a by-pass passage around the blower, by-pass valve means to vary the output of the blower, and by-pass valve control means responsive to the pressures in the venturi and in the fuel conduit at a point on the engine side of the blower.

11. In a control for an internal combustion engine having a fuel supply conduit including a carburetor, a blower, a throttle valve between the carburetor and blower, a by-pass conduit around the blower and a valve in the by-pass conduit to control the blower output, and means to automatically operate the by-pass valve control jointly controlled by the pressures in the carburetor and the by-pass conduit.

12. In combination, an internal combustion engine having a fuel supply conduit including a Venturi passage, an engine driven blower mounted in the fuel conduit between the venturi and the engine adapted to force the fuel charge into the engine at an increased rate and pressure, a by-pass conduit connecting the inlet and outlet of the blower, a by-pass valve in the by-pass conduit, a throttle valve mounted in the fuel conduit between the inlet to the blower and the venturi, resilient means urging said by-pass valve to closed position, a pressure responsive device connected to said by-pass valve adapted to open said by-pass valve when sufficient vacuum has been applied to said pressure responsive device to overcome the resilient means urging said by-pass valve to closed position, and a selector valve connected by conduits to the venturi, to the fuel conduit on the engine side of the blower, and to the pressure responsive device, said selector valve being adapted to select the highest vacuum concurrently existing in the venturi and in the fuel conduit and to apply this selected vacuum to the pressure responsive device to effect opening of the by-pass valve.

13. In combination, an internal combustion engine having a fuel supply conduit provided with a venturi, a supercharger mounted in the fuel supply conduit between the venturi and the engine, a throttle valve mounted in the fuel supply conduit between the venturi and the supercharger, a by-pass conduit extending around the supercharger from the outlet to the inlet side thereof, a by-pass valve mounted in the by-pass conduit and normally urged to closed position by resilient means, pressure responsive means adapted to open the by-pass valve, a selector valve assembly connected between a point in the venturi and a point in the fuel supply conduit on the outlet side of the supercharger adapted to select the highest vacuum concurrently existing at these specified points and to apply this selected vacuum to the pressure responsive means so that supercharging will be applied during low speed, open throttle, heavy engine loads and discontinued at part throttle, light and medium engine loads and at high speed, open throttle, heavy engine loads.

14. In combination, an internal combustion engine having a fuel supply conduit provided with a Venturi passage, a supercharger mounted in the fuel supply conduit between the Venturi passage and the engine, a throttle valve mounted in the fuel supply conduit between the Venturi passage and the supercharger, a by-pass conduit extending around the supercharger from the outlet to the inlet side thereof, a by-pass control valve mounted in the by-pass conduit and normally urged to closed position by resilient means, pressure responsive means adapted to be actuated to open the by-pass valve, a selector valve assembly connected by conduits to a point in the Venturi passage and to a point in the fuel supply conduit on the outlet side of the supercharger adapted to select the lowest of the pressures concurrently existing at these specified points and to apply this selected pressure to the pressure responsive means to effect actuation thereof.

15. In a supercharged internal combustion engine installation having an engine fuel supply conduit including a venturi, a blower between the venturi and the engine and a throttle valve between the blower and the venturi, a by-pass conduit extending around the blower from the outlet side to the inlet side thereof, a by-pass control valve, and means for actuating the by-pass control valve responsive to the pressures in the carburetor venturi and the fuel supply conduit at a point on the outlet side of the blower.

16. In an internal combustion engine having a fuel supply system including a conduit with a carburetor having a venturi, a throttle valve downstream from the venturi, and a blower downstream from the throttle valve discharging into an engine intake manifold, a by-pass conduit from the outlet to the inlet side of the blower, a by-pass control valve, and means responsive to the pressure differential between a point in the venturi and a point in the intake manifold adapted to effect operation of the by-pass control valve.

17. In an internal combustion engine having a spark fuel ignition system, a fuel supply system including a conduit with a throttle valve and an intake manifold downstream therefrom, a supercharger in the fuel supply conduit mounted between the throttle valve and the intake manifold, differential pressure operated means for adjusting the timing of the ignition spark, and means responsive to the pressure differential between a point in the fuel supply conduit upstream from the throttle valve and a point in the intake manifold downstream from the outlet from the supercharger adapted to effect automatic operation of the spark adjusting means.

18. In a supercharged internal combustion engine installation including a spark fuel ignition system and an engine fuel supply conduit having a throttle valve and a supercharger mounted therein, the supercharger being interposed between the throttle valve and the engine, an engine spark distributor, and pressure responsive means adapted to automatically adjust the timing of the distributor spark, the pressure responsive means being controlled by the pressure differential existing between a pair of points in the fuel supply conduit, one of which is located upstream from the throttle valve and the other of which is located downstream from the supercharger outlet.

19. In a supercharged internal combustion engine installation including a spark fuel ignition system and an engine fuel supply conduit having a throttle valve and a blower mounted therein, the blower being positioned between the throttle valve and the engine, an engine ignition spark distributor including pressure operated adjusting means therefor adapted to be automatically actuated to vary the ignition spark timing, and pressure responsive means controlled by the respective pressures in the fuel supply conduit upstream from the throttle valve and downstream from the blower outlet to actuate the spark adjusting means.

20. In combination, an internal combustion engine of the spark ignition type having a fuel supply conduit provided with a throttle valve and a blower, the blower being positioned between the throttle valve and the engine and arranged to force the fuel charge from the supply conduit into the engine, an engine spark ignition device, pressure responsive means associated with the spark ignition device adapted to be actuated to adjust the timing of the spark ignition device, and a selector valve assembly connected to the fuel supply conduit at a point upstream from the throttle valve and at another point downstream from the blower and adapted to select the highest concurrently existing pressure at these two points and to apply this selected pressure to the said pressure responsive means to effect actuation thereof.

21. In combination, an internal combustion engine, a fuel conduit to said engine including a venturi and a throttle valve, an engine driven blower connected in said conduit between the throttle valve and engine, a by-pass passage around the blower, by-pass valve means to vary the output of the blower, by-pass valve control means responsive to the pressures in the venturi and in the fuel conduit at a point on the engine side of the blower, spark ignition mechanism for the engine, and means responsive to the pressures in the fuel conduit at a point on the inlet side of the throttle valve and at a point on the engine side of the blower to adjust the timing of the ignition spark in accordance with the engine load.

22. In combination, an internal combustion engine having a fuel supply conduit including a venturi and a blower mounted between the venturi and the engine adapted to force the fuel charge through the supply conduit to the engine, a throttle valve mounted in the supply conduit between the venturi and the blower, a by-pass conduit around the blower from the outlet to the inlet side thereof, a by-pass valve mounted in the by-pass conduit, pressure responsive means to automatically operate the by-pass valve controlled by the pressures in the venturi and in the supply conduit on the outlet side of the blower, an ignition spark distributor for the engine, a pressure responsive control device adapted to be operated to advance and retard the ignition spark, and a pressure operated selector valve assembly connected by conduits to the supply conduit at a point on the intake side of the throttle valve to the supply conduit at a point on the outlet side of the blower and to the pressure responsive control device to automatically operate the pressure responsive control device for the ignition spark.

23. In combination, an internal combustion engine having a fuel supply conduit including a blower adapted to force the fuel charge in the conduit into the engine, a by-pass conduit around the blower from the outlet to the inlet side thereof, a by-pass valve to control the output of the blower, a first pressure responsive means to automatically operate the by-pass valve, a throttle valve mounted in the fuel supply conduit on the inlet side of the blower, an engine ignition spark distributor, a second pressure responsive means adapted to be actuated to adjust the timing of the distributor ignition spark, and a selector valve assembly connected to the fuel supply conduit at a point on the inlet side of the blower immediately upstream from the throttle valve, and at a point on the outlet side of the blower, said selector valve assembly being adapted to select the highest concurrently existing pressure at these two specified points and to apply this selected pressure to the second pressure responsive means to effect automatic actuation thereof.

24. In combination, an internal combustion engine having a fuel supply conduit provided with a Venturi passage, a supercharger mounted in the fuel supply conduit between the Venturi passage and the engine, a throttle valve mounted in the fuel supply conduit between the Venturi passage and the supercharger, a by-pass conduit extending around the supercharger from the outlet to the inlet side thereof, a by-pass valve mounted in the by-pass conduit and normally urged to closed position by resilient means, a first pressure responsive means adapted to open the by-pass valve, a first selector valve assembly connected by conduits to a point in the Venturi passage and to a point in the fuel supply conduit on the outlet side of the supercharger adapted to select the highest of the vacuums concurrently existing at these specified points and to apply this selected vacuum to the first pressure responsive means to operate the by-pass valve, an engine ignition spark distributor, a second pressure responsive means adapted to adjust the timing of the ignition spark, a second selector valve assembly connected by conduits to a point in the fuel supply conduit on the inlet side of the throttle valve and to a point in the fuel supply conduit on the outlet side of the blower adapted to select the highest pressure concurrently existing at these last specified points and to apply this selected pressure to the second pressure responsive means to effect automatic adjustment of the spark timing.

25. In combination, an internal combustion engine of the spark ignition type provided with a fuel supply conduit including a throat portion having a manually operable throttle valve mounted therein, and an intake manifold, a blower mounted in the supply conduit between the throttle valve and the intake manifold, by-pass means associated with the blower adapted to vary the blower output in accordance with the engine load, spark ignition mechanism for the engine, pressure operated means to adjust the spark igition mechanism so as to vary the timing of the spark, and means adapted to select the higher of the pressures concurrently existing in the throat of the supply conduit immediately adjacent the upstream side of the throttle valve and in the intake manifold and to apply this selected pressure to the spark adjusting means to effect operation thereof.

26. In combination, an internal combustion engine of the spark ignition type provided with a fuel supply conduit including a throat portion having a manually operable throttle valve mounted therein, and an intake manifold, a blower mounted in the supply conduit between the throttle valve and the intake manifold, by-pass means associated with the blower adapted to vary the blower output in accordance with the engine load, spark ignition mechanism for the engine, pressure operated means to adjust the spark ignition mechanism so as to vary the timing of the spark, and means adapted to select the higher of the pressures concurrently existing in the throat of the supply conduit immediately adjacent the upstream side of the throttle valve and in the intake manifold and to apply this selected pressure to the spark adjusting means to effect operation thereof, said means comprising a selector valve unit having a casing with an outlet bore connected by a conduit to the spark adjusting means and inlet bores connected by conduits to the throat of the supply conduit and to the intake manifold and a valve mounted in the casing adapted to be operated by the pressure differential in the inlet bores.

CLIFTON M. ELLIOTT.
EUGENE P. WISE.

REFERENCES CITED

The following references are of record in the file of this patent:

UNITED STATES PATENTS

| Number | Name | Date |
|---|---|---|
| 1,955,799 | Fielden | Apr. 24, 1934 |
| 1,984,013 | Fast | Dec. 11, 1934 |
| 2,311,936 | Elfes et al. | Feb. 23, 1943 |
| 2,356,379 | Caris et al. | Aug. 22, 1944 |
| 2,380,967 | Jarvis | Aug. 7, 1945 |
| 2,390,146 | Hasbrouck | Dec. 4, 1945 |
| 2,390,166 | Parkins et al. | Dec. 4, 1945 |
| 2,456,042 | Beardsley, Jr., et al. | Dec. 14, 1948 |

Certificate of Correction

Patent No. 2,559,859                                    July 10, 1951

CLIFTON M. ELLIOTT ET AL.

It is hereby certified that error appears in the printed specification of the above numbered patent requiring correction as follows:

Column 4, line 67, for "supercharged" read *supercharger*; column 5, line 55, for "trottle" read *throttle*; column 8, line 75, for "pressure" read *pressures*; column 13, line 30, for "igition" read *ignition*;

and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*